United States Patent [19]

Tu et al.

[11] 4,319,811
[45] Mar. 16, 1982

[54] ABRASION RESISTANCE RADIATION CURABLE COATING

[75] Inventors: Shu-Tung Tu, East Brunswick; Donald H. Lorenz, Basking Ridge, both of N.J.

[73] Assignee: GAF Corporation, New York, N.Y.

[21] Appl. No.: 80,200

[22] Filed: Oct. 1, 1979

[51] Int. Cl.³ .................... G02C 7/02; B32B 27/30
[52] U.S. Cl. ........................ 351/166; 204/159.23; 427/54.1; 428/411; 428/412; 428/441; 428/442; 428/461; 428/463; 428/507; 428/510; 428/513; 428/514; 428/516; 428/500; 428/522; 428/523; 428/520
[58] Field of Search ............ 428/412, 510, 507, 520, 428/441, 442, 461, 463, 513, 514, 522, 523, 500, 411, 516; 526/264; 204/159.23; 351/166; 427/54.1

[56] References Cited

U.S. PATENT DOCUMENTS

| | | | |
|---|---|---|---|
| 3,922,440 | 11/1975 | Wegworth | 428/412 |
| 3,968,305 | 7/1976 | Oshima | 428/412 |
| 4,013,825 | 3/1977 | Denzinger | 526/264 |
| 4,026,826 | 5/1977 | Yoshida | 204/159.23 |
| 4,135,007 | 1/1979 | Lorenz | 428/412 |
| 4,158,647 | 6/1979 | Azorlosa | 428/412 |
| 4,190,681 | 2/1980 | Hall | 428/412 |
| 4,195,103 | 3/1980 | Chang | 204/159.23 |
| 4,199,421 | 4/1980 | Kamada | 204/159.23 |
| 4,205,139 | 5/1980 | Barzynski | 204/159.23 |

*Primary Examiner*—Ellis P. Robinson
*Attorney, Agent, or Firm*—James Magee, Jr.; Sheldon H. Parker

[57] ABSTRACT

The invention relates to a radiation curable coating which provides superior abrasion and chemical resistance and excellent adhesion properties. The coating is produced by radiation curing. A first monomer selected from the group consisting of triacrylates and tetracrylate mixed with a second monomer having an N-vinyl imido group, preferably an N-vinyl lactam, such as vinyl pyrrolidone or vinyl caprolactam. The monomer mixture is substantially oligomer-free and if the radiation is ultraviolet light, a photoinitiator, preferably p-phenoxydichloro acetophenone or dimethoxyphenyl acetophenone, is included in the mixture.

26 Claims, No Drawings

ABRASION RESISTANCE RADIATION CURABLE COATING

BACKGROUND OF THE INVENTION

1. Field of the Invention

This invention relates to radiation curable coating which is produced from a polyacrylate monomer and a vinyl monomer having an N-vinylimido grouping and, more particularly, to a tri- or tetraacrylate monomer in combination with an N-vinyl lactam monomer.

2. Description of the Prior Art

It is known that superior abrasion resistant coatings can be produced by thermal curing systems, but these suffer disadvantages, including the requirement to remove solvents and provide heat to process the coating which results in high costs for energy and air pollution control and eliminates their use on heat-sensitive materials. Thermal curing systems also do not lend themselves to rapid, continuous processing, as opposed to slow, batch processing, because of the requirement for heat and dwell time in the ovens to complete the cure and develop the superior abrasion resistance.

One hundred percent solids, radiation curing systems overcome the disadvantages of energy costs, solvent emissions, high temperatures, and slow batch processing associated with thermal curing systems. However, most radiation curing systems for abrasion resistant coatings developed up to this time have incorporated reactive polymers such as an urethane acrylate, together with various reactive monomers. These systems do not show the superior abrasion and chemical resistance properties of the best thermal curing systems.

Radiation curing systems using reactive monomer ingredients, without significant amounts of reactive polymers, are known which produce the desired superior abrasion and chemical resistance but these coatings are too brittle and produce too much curl for use on flexible substrates. Also, they exhibit poor adhesion on many substrates which, combined with their brittleness, results in undesirable cracking and peeling off from the substrate. In those cases where the existing monomer-based radiation curing coatings can be made to adhere to a rigid substrate without some type of adhesion failure, they exhibit slow radiation curing speeds and high viscosities which make rapid processing and smooth coating application difficult.

SUMMARY OF THE INVENTION

It has now been found that the disadvantage of the prior art systems can be overcome through the use of a radiation curable coating which provides superior abrasion and chemical resistance and excellent adhesion properties.

In accordance with the present invention, a first monomer selected from the group consisting of triacrylates and tetraacrylates is mixed with a second monomer having an N-vinyl imido group, preferably an N-vinyl lactam and subjected to radiation until cured. The monomer mixture is substantially oligomer-free and can include a photoinitiator such as p-phenoxydichloroacetophenone and dimethoxyphenylacetophenone.

DESCRIPTION OF THE PREFERRED EMBODIMENTS

Crosslinked coatings of tri- and tetraacrylate monomers, such as pentaerythritol triacrylate (PETA) are recognized as providing extremely high abrasion resistance under severe test conditions such as the DuPont Steel Wool Rotary Test which involves subjecting the coating to five revolutions of a 1.25 square inch pad of commercially available 0000 grade steel wool which has been loaded with appropriate weights to give either 12 or 24 p.s.i. pressure. Abrasion resistance is rated according to the increase in the level of haze from rubbing with the steel wool.

However, these coatings, especially with PETA, exhibit shrinkage causing curl in the care of thin substrates and, further, exhibit cracking when a thick coating is applied on any substrate and subjected to bending. Generally, copolymerization of PETA with low Tg yielding monomers and/or oligomers enhances the resistance to cracking due to bending and curl due to shrinkage when the copolymers are applied to various substrates. However, curing speed and abrasion resistance are sacrificed, particularly in the care of resistance to severe abrasion.

An extremely abrasion resistant coating with good curl and cracking-resistance properties is obtained by copolymerizing a tri- and/or tetraacrylate monomer and a monomer having an N-vinyl imido group, such as a vinyl lactam monomer. The acrylate is preferably pentaerythritol triacrylate (PETA) or trimethylolpropane triacrylate (TMPTA) and the preferred lactams are N-vinyl pyrrolidone (VP) and N-vinyl caprolactam (VC). The structural formulas for these materials are:

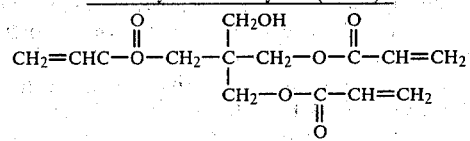

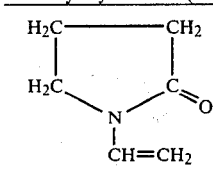

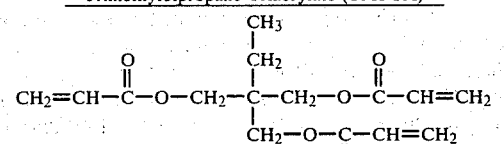

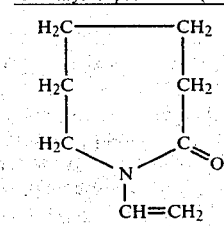

The lactams tend to have a greater shelf-like stability than open chain, N-vinyl imido monomers are preferred.

The following table shows the curing rate in air under a high power (two 200 w/in. lamps) UV source (PPG-QC 1202 A/N) of four triacrylate formulations containing 79.3 parts by weight of triacrylate, 20.7 parts by weight of the vinyl lactam, 5 parts by weight of the photoinitiator sold under the Trademark Sandoray 1000 by Sandoz. For evaluation, each formulation was coated on 3 MIL polyester film, sold by ICI as Melinex 505 film, using a no. 3 wire wound rod. The coating thickness was approximately 0.5 MIL. For comparison purposes, the same procedure was used to coat formulations of 100 parts by weight of triacrylate monomer (PETA or TMPTA) with 5 parts per weight of Sandoray 1000.

TABLE I

| Coating | Viscosity (cps.) @25° C. (Brookfield) | Curing Rate (ft/min) | Steel Wool Abrasion Resistance (Δ Haze) |
|---|---|---|---|
| Melinex 505 Polyester Film (ICF) | | | 26.8 |
| Lucite AR (DuPont) | | | 3.1 |
| PETA (100) | 717 | 150 | 4.4 |
| | | 100 | 0.5 |
| PETA/VP (79.3/20.7) | 99 | 175 | 3.1 |
| | | 125 | 0.2 |
| PETA/VC (79.3/20.7) | 180 | 75 | 1.4 |
| | | 50 | 0.7 |
| TMPTA (100) | 82 | 17 | 3.9 |
| TMPTA/VP (79.3/20.7) | 28 | 25 | 1.0 |
| TMPTA/VC (79.3/20.7) | 39 | 25 | 3.7 |
| | | 17 | 1.8 |

The curing rate of PETA/VP was actually faster than for PETA alone, even though it is known that VP alone does not cure readily with either UV or electron beam radiation. It would appear that the enhanced cure rates observed with VP or VC as a diluent monomer are due to a charge transfer complex formed between VP or VC and acrylates. The N-vinyl imido

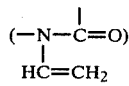

grouping in the vinyl monomers might be involved in this complex formation and, thus, be responsible for the substantial curing rate enhancement. None of the commonly used diluent monomers have the same effect and, in fact, substantially slow the curing rate of PETA alone. These diluent monomers include ethylhexyl acrylate, diethoxyethyl acrylate, phenoxyethyl acrylate, and dicyclopentadienyloxyethyl acrylate. Thus, the function of diluent monomers has been limited to viscosity reduction, since they tend to have adverse effects on the curing rate.

It can be seen from Table I that the abrasion resistance of the coating depends on the curing rate. Within the limit of complete curing, the longer the exposure, the greater will be the abrasion resistance. To obtain an abrasion resistance with a change in percent haze of nearly zero, required a longer exposure than to obtain an abrasion resistance with an increase in percent haze of 3.1. The curing rates described are based on the use of two 200 w/in. lamps and for a higher rate of production, if necessary, more lamps can be installed. The use of more than two 200 w/in. lamps, or their equivalent, is not uncommon in commercial applications.

It is noted that while TMPTA does not have a high shrinkage coefficient and can be used alone without a diluent monomer, it needs VP or VC to enhance the curing rate.

The usefulness of VC, besides curing rate enhancement, is its low volatility (less volatile than VP), low moisture sensitivity (more hydrophobic than VP), and low Tg (a better impact modifier than VP).

Low viscosity formulations are, generally, favored from the rheological point of view, especially in making coatings of less than 0.5 MIL. Low viscosity formulations provide better wetting and faster leveling and contribute to higher productivity. Thus, the viscosity reduction from the use of VP or VC, as shown in Table I, contributes to the effectiveness of the systems of the present invention.

The preparation of the formulation is very simple because no chemical reaction is involved. Since both PETA and VC are solids at ambient temperature, a gentle warming (40° C.) is preferred to melt the material before mixing. In a typical preparation, after the comonomers are mixed, a silicone surfactant DC-193 (Dow Corning), in the amount of 0.5%, and the photoinitiator (Irgacure 651 or Sandoray 1000) in the amount of 3–5% are mixed thoroughly in the solution. Both materials are very soluble in the comonomers. Because of its fast curing rate with UV radiation, the formulation with photoinitiator present should be kept in the dark before use and exposure to light source.

The coatings of the instant invention not only provide superior abrasion and chemical resistance and excellent adhesion properties but also have other desirable features for a protective layer including stability to discoloration and degradation of properties by ultraviolet light, optical quality transparency including (non-yellow color) and good printability.

Among the applications for the coating is the coating of plastic lenses made from materials, such as cellulose acetate butyrate, cellulose acetate propionate, cellulose acetate, polycarbonate, polystyrene, methyl methacrylate, copolymer of styrene and methyl methacrylate, and allyl diglycol carbonate.

Additionally, the coatings can be used on flexible or rigid plastic materials, including sheets, foams and various shapes, such as associated with cast forms. The coatings can be applied and cured either before or after the molding operation. Additional plastic substrates include polyolefins, such as polypropylene and polyethylene, polycarbonate, polyvinyl chloride (PVC), polyethylene terephthalate (PET), polybutylene terephthalate (PBT), polystyrene, methyl methacrylate, polyamide (nylon), polymethyl pentene and polyethersulfone.

Protective Top Coatings over other coatings-wide variety including ratiation cured coatings, pigmented coatings, varnishes, and the like. Additional substrates include:

Wood

Metal, such as aluminum, steel and copper

Paper, including impregnated and surface coated paper

Glass, including fiberglass and glass fiber optics

Tile, such as ceramic, vinyl and vinyl/asbestos and

Textiles, including various natural and synthetic fibers.

To achieve functional coating properties in addition to superior abrasion and chemical resistance and excellent adhesion, additives known in the art, such as pigments for gloss control, wetting agents for surface uniformity and flatness, and dyes or colored pigments to produce colored coatings, can be added.

The coating can be done by conventional techniques including dip, spin, spray, curtain coat, gravure, and roller. Where dirt contamination is undesirable, such as with plastic lenses, the coating should be done in a suitable dust-free atmosphere.

Although photoinitiators, in general, can be used in tri- and tetraacrylate/N-vinyl imido UV polymerizable systems, dramatic differences were experienced in respect to abrasion resistance.

Dialkoxy acetophenones, such as dibutoxy acetophenone and alkoxy phenyl acetophenones, such as methoxy-phenyl acetophenone did not give the desired results, whereas p-phenoxy dichloro acetophenone and dimethoxyphenyl acetophenone gave extremely good results in all respects.

The following table compares the results obtained using various photoinitiators with pentaerythritol triacrylate/vinyl pyrrolidone in a 79.3/20.7 weight ratio. The UV source was a PPG system designated QC 1202 A/N employing two lamps. The substrated was primed polyester film and the curing rate was 50 ft./min./2 lamps. Primed polyester films are films treated for adhesion enhancement and sold under the designation clear-055-primed by ICI Corporation and 4561-primed by Celanese Corporation. In the following table, the (p-phenoxy)dichloro acetophenone is sold under the Trademark Sandoray 1000 by Sandoz Corporation and the (dimethoxy phenyl) acetophenone, is sold under the Trademark Irgacure 65, by Ciba-Geigy Corporation. Their structures are as follows:

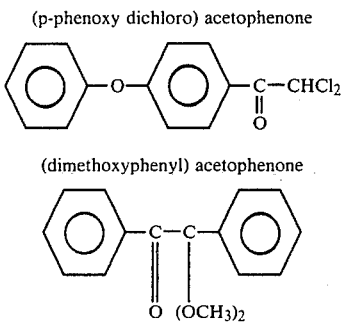

TABLE II

| Photoinitiator (3%) | Acetone Resistance | Steel Wool Abrasion Resistance (Change in Haze) |
|---|---|---|
| p-phenoxydichloro acetophenone | Good | 0.3 |
| dimethoxyphenyl acetophenone | Good | 0.5 |
| dibutoxy acetophenone | Good | >5 |
| chlorinated benzophenone | Good | " |
| aryl ketone | Good | " |
| benzophenone/dimethyl ethanol amine | Good | " |
|  | Good | " |
| diethoxy acetophenone | Poor | >10 |
| a-isobutoxy-a-phenyl acetophenone | Poor | " |
| a-methoxy-a-phenyl acetophenone | Poor | " |

The chlorinated benzophenone is sold under the Trademark Trigonal P-1 by Noury Corporation and Eastman FI-4 by the Eastman Corporation. The aryl ketones are sold under the Trademarks EM-1173 and EM-1176 by Merck Corporation. The a-isobutoxy-a-phenyl acetophenone is sold under the Trademark Vicure 10 by Stauffer Chemical Corporation and is 2-chlorothioxanthone sold under the Trademark Sandoray 1050 by Sandoz Corporation.

It is, thus, seen that through the use of a specific photoinitiator, high abrasion resistant UV curable coatings can be attained in air cure systems without the expected sacrifice in curing speed and without the need to use a photoinitiator concentration level above those normally employed.

Where equipment limitations do not preclude the use of a controlled nitrogen atmosphere or a slow curing rate is of no consequence, suitable photoinitiators can include vicinal ketaldonyl compounds (i.e., compounds containing a ketone group and an aldehyde group) such as diacetyl, benzil, 2,3-pentanedione, 2,3-octanedione, 1-phenyl-1,2-butanedione, 2,2-dimethyl-4-phenyl-3,4-butanedione, phenyl-glyoxal, diphenyl-triketone; aromatic diketones, such as anthraquinone; acyloins, such as benzoin, pivaloin acryloin ethers, such as benzoin-methyl-ether, benzoin-ethyl-ether, benzoin-butyl-ether, benzoin-isobutyl-ether, benzoin-phenyl-ether; alpha-hydrocarbon substituted aromatic acyloins, including alpha-methyl-methylbenzoin, alpha-alkyl-benzoin, as in U.S. Pat. No. 2,722,512, and phenylbenzoin; diaryl ketones, such as benzophenone and dinaphthyl ketone; and organic disulfides, such as diphenyldisulfide. The photoinitiator can also include a synergistic agent, such as a tertiary amine, to enhance the conversion of photo-absorbed energy to polymerization initiating free radicals. Dimethoxyphenylacetophenone such as IRCA-CURE 651 available from Ciba-Geigy or Sandoray 1000 are preferred. The photoinitiator is present in the coating composition in an amount sufficient to initiate the desired polymerization under the influence of the amount of actinic light energy absorbed. The coating composition generally contains from 0.01 to 5 weight percent of photoinitiator based on the weight of the coating composition.

The coating composition can also contain an additional polymerization inhibitor to prevent undesirable auto-polymerization of the coating composition in storage prior to use. Examples of suitable addition polymerization inhibitors include, among others, di(1,4 sec-butylamino) benzene available from the DuPont Company under the trade name "Anti-Oxidant 22" and Monomethyl Ether of Hyroquinone and Hydroquinone phenothiazine available from Tefenco Chemical Co. The additional polymerization inhibitor is present in an amount sufficient to prevent auto-polymerization and is generally present in an amount from 100–300 PPM based on the weight of the coating composition.

The coating composition can also contain a surfactant. The preferred surfactants are silicone surfactants such as that available from the Dow Corning Corporation under the trade name "DC-193". The surfactant is present in an amount necessary to reduce the surface tension of the coating composition and reduce its viscosity to the desired level. The surfactant generally comprises from 0.01 to 2 weight percent based on the weight of the coating composition.

The coating compositions of the present invention can also contain other conventional additives, such as flow control and leveling agents, organic and inorganic dyestuffs and pigments, fillers, plasticizers, lubricants, and reinforcing agents, such as alumina, silica, clay, talc, powdered glass, carbon black and fiberglass.

The coating compositions of the present invention can be cured by applying them as a film on the substrate. Typical coating thicknesses are 1–25 microns. Curing can be done under air or under an inert atmosphere of nitrogen. The coating composition may be applied as a thin film in any conventional manner such as by spraying, brushing, dipping, roll coating and the like.

Conventionally, the film on the substrate is positioned to travel on a conveyor or some other film handling equipment and pass under a source of a free radical generator, such as radiation. The coated side of the substrate is exposed to the radiation for a time sufficient to effect polymerization and convert the film into an adherent, tough, flexible coating.

As used herein the term radiation refers to any radiation source which will produce free radicals and induce additional polymerization of vinyl bonds. The actinic radiation is suitable in the wave length of 2000–7500 A, preferably 2000 to 4000. A class of actinic light useful herein is ultra-violet light and other forms of actinic radiation are from the sun, artificial sources such as Type RS sunlamps, carbon arc lamps, Xenon arc lamps, mercury vapor lamps, tungsten halide lamps, lasers, fluorescent lamps with ultra-violet light emitting phosphors.

Ultra-violet curing rates greater than 20 ft/min 200 w./in. lamp must be obtained in order to be commercially acceptable in most applications. With a reasonable coating thickness (about 0.5 MIL), the coating compositions with this invention can be cured at rates of 25–100% ft/min 200 w./in. lamp.

The preferred electron beam system contains a wide curtain of electrons directly from a linear cathode. A curtain of electrons from the gun's cathode, accelerated to a high velocity by a 200 KV potential, emerges from the chamber through a foil window into the coated substrates (Electron-curtain $^{TM}$ by Energy Sciences, Inc.).

The electron beam curing of the coating compositions as described above is cured at less than 5 Mrads and generally at between 1 and 2 Mrads. Curing at greater than 8 Mrads is usually deemed unacceptable because of the higher cost.

For evaluation, each formulation was cast on the substrate by means of a wire rod. A No. 3 rod was used for flexible polyester films and a No. 12 rod was used for rigid substrates, such as PVC and polycarbonate (Lexan). These will approximate a coating thickness of 0.5 mils and 1.5 mils, respectively.

The wet films were cured under air with three different UV sources: PPG-QC 1202 A/N (consisting of two 200 watts/in. Hg lamps), Linde DBHG3M13-14 (consisting of three 100 w/in. Hg Lamps) and Fusion 208V K-520Q357-358 (consisting of one 300 w/in. Hg lamp). The film was cured to a condition in which it is abrasion resistant under DuPont's Steel Wool Rotary test. An increase in "haze" of less than 4 was considered to be abrasion resistant by the commercial standard.

Haze is measured in percent and determined in accordance with ASTM D1003. The Steelwool Rotary Test is a severe abrasion test using 1.25 inch square pad of commercially available 0000 grade steelwool. The wool is loaded with appropriate weights to give either 12 or 24 p.s.i. pressure and revolved five times. The results are reported as an increase in percent haze (Delta Haze) using the ASTM D1003 test procedure for measuring haze before and after the test. The steelwool rotary test described herein employed sufficient weights on the steelwool pad to produce a 12 p.s.i. pressure.

Lucite AR with commercial abrasion resistant glazing undergoes a haze change of 3.1, whereas the uncoated polyester film undergoes a haze change of 26.8.

Table III illustrates the effect ov varying the PETA/VP ratio (weight percent) on abrasion resistant coatings. In each case, the UV source was a PPG-quartz crystal 1202 A/N unit employing two lamps. The substrate was primed polyester film. The photoinitiator, in each case, was a dimethoxyphenolacetophenone sold under the trademark Irgacure 651 and employed in an amount of 3% by weight of the monomers. The use of increased concentrations of VP decreased the viscosity of the system, thereby making the application of the coating material easier. It is noted that the pure PETA system gave good acetone resistance and adequate haze change at modest curing rates. However, the high viscosity significantly interferred with processing procedures. The use of as little as about 10% VP significantly decreased the viscosity thereby facilitating the coating operation without significantly affecting the change in haze for the 50 feet per minute curing rate. At VP concentration of over about 41%, a curing rate decrease was required to stay within the acceptable haze change rate.

Table IV relates to the use of the procedure of Table III employing pentaerythritol triacrylate with vinyl caprolactam and employing 5% of Irgacure 651. Table IV shows that VC significnatly reduces the viscosity of the PETA formula. The use of up to about 31% VC produced traumatic viscosity reduction without resulting in a haze change of greater than 3 at a 17 foot per minute curing rate. It is further noted that a greater energy input is necessary to provide the same curing rate using VC as that which is obtained with VP. Since VC is more hydrophobic than VP, its copolymer is less water sensitive.

Table V relates to the test procedure employed with materials of Table III using pentaerythritol triacrylate in combination with other monomers. Three percent Irgacure 651 was employed while otherwise following the prior noted procedure. The table shows that none of the other monomers evaluated were as effective as vinyl pyrrolidone in producing the desired result. Phenoxyethylacrylate and dicyclopentadienyloxyethyl imparted significantly higher viscosity. In each case, the curing rate was from 4 to 6 times slower than with the systems noted in Examples I and II to approximate the same abrasion resistance.

Table VI shows that VP was fastest in reactivity and VC next highest, when Sandoray 1000 was employed in a 5% concentration. The use of the difunctional acrylate hexindiodiacrylate and the mono functional acrylates, ethylhexoacrylate, diethoxyethylacrylate, phenoxyethylacrylate, dicyclopentadienyloxyethylacrylate required substantially slower curing rates to achieve results comparable to those attainable with either VP or VC.

In the examples of Table VI, the Sandoray 1000 photoinitiator was used in a 5% concentration with trimethylpropanetriacrylate/vinyl pyrrolidone films using the aforenoted procedures of Tables V and VI. It is evident from Table VII that TMPTA homopolymer alone was abrasion resistant but required much more energy to cure than the PETA homopolymer. TMPTA, by itself, has a lower viscosity than PETA. An enchanced curing rate and reduced viscosity was attained with the addition of VP. A haze change of under 3 could be obtained with VP concentrations below about 40%.

Table VIII relates to TMPTA/VC films using 5% of the Sandoray 1000 photoinitiator. A VC concentration of up to about 30 weight percent could be employed to obtain optimum viscosity reduction, maintained curing rate and maintained the Haze change below about 3.

Table IX relates to TMPTA/monomer films using 5% of the Sandoray 1000 photoinitiator in accordance with the aforenoted procedure. In Table I it is evident that VP yielded improved curing rates and decreased viscosity.

The use of vinyl pyrrolidone gave a viscosity decrease and a curing rate increase without a sacrifice and abriasion resistance as measured through the change in haze. The vinyl caprolactam gave improved viscosity properties without a sacrifice in curing rate or haze change. The phenoxylethylacrylate gave an improved viscosity with no curing rate decrease but a loss in abrasion resistance, thus, a curing rate decrease would have been required to maintain roughly the same haze change quality.

Table X illustrates the abrasion resistance of PETA/VP films, 1.2 mils in thickness cured using a PPG-QC1202 A/N unit and employing a PETA/VP weight percent ratio of 79.3 to 20.7. In the case of a polyvinyl chloride substrate, the Sandoray 1000 and Irgacure 651 gave roughly comparable results. Using a substrate of a polycarbonate sold under the trademark Lexan by General Electric Corportion, Sandoray gave better results than those obtained with the Irgacure 651.

EXAMPLE

A lens of a pair of sunglasses sold under the Trademark Foster Grant were coated on both sides with a PETA/VP mixture in the weight ratio of 80/20 and containing 3 weight percent Irgacure 651, as the photoinitiator.

Excess coating was removed from the lenses which were determined to be made of cellulose acetate butyrate, by centifuging. The coating was cured at a rate of 100 ft. per minute under two PPG-QC 1202 A/N lamps.

The abrasion resistance was tested by rubbing the coated and uncoated lenses with 000 steelwool. The results from ten strokes of the steelwool across both lenses showed the coated lens to be resistant to the abrasion, whereas the uncoated lens was not. Adhesion was determined to be 100%, using the following test procedure:

Eleven lines were cut in the coating in a first direction and then normal thereto to produce 100 small squares. A No. 600 3M cellulose tape was applied to the surface of the lens and pulled away without removing any coating.

TABLE III

Steelwool Abrasion Resistance of Pentaerythritol Triacrylate/Vinyl Pyrrolidone Films

| No. | PETA/VP Wt. % | Viscosity (25° C.), cps. | Curing Rate, ft/min/2 lamps | Acetone Resistance | Haze |
|---|---|---|---|---|---|
| 1 | 100 | 717 | 150 | + | 10.0 |
| 2 | | | 100 | + | 11.0 |
| 3 | | | 50 | + | 0.3 |
| 4 | 89.6/10.4 | 240 | 50 | + | 0.6 |
| 5 | 79.3/20.7 | 99 | 150 | + | 10.0 |
| 6 | | | 100 | + | 2.2 |
| 7 | | | 50 | + | 0.5 |
| 8 | 68.9/31.1 | 61 | 50 | + | 1.2 |
| 9 | 63.7/36.3 | 33 | 50 | + | 1.6 |
| 10 | 59.3/40.7 | 26 | 50 | + | 3.0 |
| 11 | 50.0/50.0 | 16 | 25 | + | 2.8 |
| 12 | 39.6/60.4 | 19 | 25 | + | 31.2 |

TABLE IV

STEELWOOL ABRASION RESISTANCE OF PENTAERYTHRITOL TRIACRYLATE/VINYL CAPROLACTAM FILMS

| No. | PETA/VC Wt.% | Viscosity (25° C.), cps. | Curing Rate, ft/min/2 lamps | Haze |
|---|---|---|---|---|
| 1 | 100.0 | 717 | 50 | 0.6 |
| 2 | 89.6/10.4 | 360 | 25 | 1.3 |
| 3 | 79.3/20.7 | 180 | 25 | 1.5 |
| 4 | 68.9/31/1 | 93 | 17 | 2.5 |

TABLE V

STEELWOOL ABRASION RESISTANCE OF PENTAERYTHRITOL TRIACRYLATE/MONOMER FILMS

| No. | PETA/Monomer | Weight % | Viscosity (25° C.), cps | Curing Rate, ft/min/2 lamps | Haze |
|---|---|---|---|---|---|
| 1 | PETA | 100 | 717 | 50 | 0.6 |
| 2 | PETA/1,6 Hexanediol Diacrylate | 79.3/20.7 | 81 | 13 | 0 |
| 3 | PETA/1,6 Hexandiol Diacrylate | 58.5/41/5 | 45 | 8 | 0.8 |
| 4 | PETA/VP | 79.3/20.7 | 99 | 50 | 0.3 |
| 5 | PETA/Ethylhexyl Acrylate | 79.3/20.7 | 81 | 13 | 0.2 |
| 6 | PETA/Diethoxyethyl Acrylate | 79.3/20.7 | 91 | 13 | 0.3 |
| 7 | PETA/Phenoxyethyl Acrylate | 79.3/20.7 | 173 | 13 | 0.2 |
| 8 | PETA/Dicyclopentadienyl oxyethyl Acrylate | 79.3/20.7 | 272 | 13 | 0.6 |

TABLE VI

STEELWOOL ABRASION RESISTANCE OF PENTAERYTHRITOL TRIACRYLATE/MONOMER FILMS

| No. | PETA/Monomer | Weight % | Viscosity (25° C.), cps | Curing Rate, ft/min/2 lamps | Haze |
|---|---|---|---|---|---|
| 1 | PETA | 100 | 717 | 100 | 0.5 |
| 2 | PETA/1,6 Hexanediol Diacrylate | 79.3/20.7 | 81 | 25 | 0.7 |
| 3 | PETA/VP | 79.3/20.7 | 99 | 100 | 0.8 |
| 4 | PETA/VC | 79.3/20.7 | 180 | 50 | 0.7 |
| 5 | PETA/Ethylhexyl Acrylate | 79.3/20.7 | 81 | 25 | 0.8 |
| 6 | PETA/Diethoxyethyl Acrylate | 79.3/20.7 | 91 | 25 | 0.7 |

TABLE VI-continued
STEELWOOL ABRASION RESISTANCE OF PENTAERYTHRITOL TRIACRYLATE/MONOMER FILMS

| No. | PETA/Monomer | Weight % | Viscosity (25° C.), cps | Curing Rate, ft/min/2 lamps | Haze |
|---|---|---|---|---|---|
| 7 | PETA/Phenoxyethyl Acrylate | 79.3/20.7 | 173 | 25 | 0.8 |
| 8 | PETA/Dicyclopentadienyl oxyethyl Acrylate (R&H) | 79.3/20.7 | 272 | 13 | 0.2 |

TABLE VII
STEELWOOL ABRASION RESISTANCE OF TRIMETHYLOLPROPANE TRIACRYLATE/ VINYL PYRROLIDONE FILMS

| No. | TMPTA/VP, Wt. % | Viscosity (25° C.), cps | Curing Rate, ft/min/2 lamps | Haze |
|---|---|---|---|---|
| 1 | 100 | 82 | 17 | 1.4 |
| 2 | 89.6/10.4 | 40 | 17 | 1.6 |
| 3 | 79.3/20.7 | 28 | 25 | 1.6 |
| 4 | 68.9/31.1 | 23 | 25 | 1.8 |
| 5 | 59.3/40.7 | 17 | 25 | 4.6 |

TABLE VIII
STEELWOOL ABRASION RESISTANCE OF TRIMETHYLOLPROPANE TRIACRYLATE/ VINYL CAPROLACTAM FILMS

| No. | TMPTA/VC, Wt. % | Viscosity (25° C.), cps | Curing Rate, ft/min/2 lamps | Haze |
|---|---|---|---|---|
| 1 | 100 | 82 | 17 | 1.4 |
| 2 | 89.6/10.4 | 54 | 17 | 0.7 |
| 3 | 79.3/20.7 | 39 | 17 | 1.8 |
| 4 | 68.9/31.1 | 28 | 17 | 3.6 |
| 5 | 59.3/40.7 | 22 | 17 | 6.4 |
| 6 | 50.0/50.0 | 18 | 17 | 12.8 |

TABLE IX
STEELWOOL ABRASION RESISTANCE OF TRIMETHYLOLPROPANE TRIACRYLATE/MONOMER FILMS

| No. | TMPTA/Monomer | Weight % | Viscosity (25° C.), cps | Curing Rate, ft/min/2 lamps | Haze |
|---|---|---|---|---|---|
| 1 | TMPTA | 100 | 82 | 17 | 1.4 |
|   |   |   |   | 13 | 0.3 |
| 2 | TMPTA/1,6 Hexanediol Diacrylate | 79.3/20.7 | 35 | 8 | 0.9 |
| 3 | TMPTA/VP | 79.3/20.7 | 28 | 25 | 1.6 |
| 4 | TMPTA/VC | 79.3/20.7 | 39 | 17 | 1.6 |
| 5 | TMPTA/Ethylhexyl Acrylate | 79.3/20.7 | 19 | 13 | 1.5 |
| 6 | TMPTA/Diethoxyclethyl Acrylate | 79.3/20.7 | 22 | 13 | 0.7 |
| 7 | TMPTA/Phenoxylethyl Acrylate | 79.3/20.7 | 39 | 17 | 2.0 |
| 8 | TMPTA/Dicyclopentadienyl-oxylethyl Acrylate | 79.3/20.7 | 54 | 10 | 1.7 |

TABLE X
STEELWOOL ABRASION RESISTANCE OF 1.2 MIL PENTAERYTHRITOL TRIACRYLATE/ VINYL PYRROLIDONE FILMS

| Photoinitiator | Curing Rate 100 ft/min/2 lamps D Haze | 50 ft/min/2 lamps D Haze |
|---|---|---|
| ON PVC SUBSTRATE | | |
| 5% Irgacure 651 | 1.3 | 0.6 |
| 3% Irgacure 651 | — | 1.6 |
| 5% Sandoray 1000 | 1.2 | 0.4 |
| 3% Sandoray 1000 | — | 1 |
| ON POLYCARBONATE SUBSTRATE | | |
| 5% Irgacure 651 | 4.8 | 2 |
| 3% Irgacure 651 | — | 5.0 |
| 5% Sandoray 1000 | 0.9 | 0.4 |
| 3% Sandoray 1000 | — | 0.9 |

What we claim is:

1. A substantially oligomer-free stable, substantially only radiation curable coating composition comprising a mixture of radiation polymerizable monomers consisting essentially of:
   (a) a triacrylate or tetracrylate monomer; and
   (b) an N-vinyl imido group containing monomer; wherein the weight ratio of acrylate monomer to vinyl monomer is in the range of from about 1 to about 10 to 1, monomer (b) being present in a quantity sufficient to produce a composition having a viscosity substantially less then that of monomer (a).

2. The radiation curable coating composition of claim 1, wherein said triacrylate or tetracrylate monomer is a triacrylate represented by the formula:

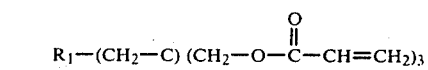

$$R_1-(CH_2-C)(CH_2-O-\overset{O}{\underset{\|}{C}}-CH=CH_2)_3$$

wherein $R_1$ is selected from the group consisting of $CH_3$ and OH.

3. The radiation curable coating composition of claim 1, wherein said N-vinyl imido group containing monomer is a lactam represented by the formula:

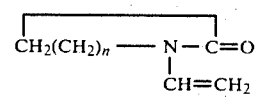

wherein n is an integer from 2 to 4.

4. The radiation curable coating composition of claim 1, wherein said composition is ultraviolet curable and further includes from about 0.5 to about 10 weight percent of photoinitiator selected from the group of substituted acetophenones.

5. A process for coating a substrate comprising the steps of applying to the surface of a substrate, an oligomer-free mixture consisting essentially of:
   (a) a triacrylate or tetracrylate monomer; and
   (b) an N-vinyl imido group containing monomer; wherein the weight ratio of acrylate monomer to vinyl monomer is in the range from about 1 to about 10 to 1, monomer (b) being present in a quantity sufficient to produce a composition having a viscosity substantially less than that of monomer (a) and subjecting said mixture to radiation for a time sufficient to form a dry polymerized abrasion resistant coating on said substrate.

6. The process of claim 5 wherein said triacrylate or tetracrylate monomer is a triacrylate represented by the formula:

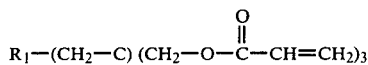

wherein $R_1$ is selected from the group consisting of $CH_3$ and $OH$.

7. The process of claim 5, wherein said N-vinyl imido group containing monomer is a lactam represented by the formula:

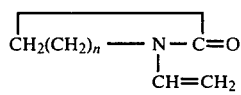

wherein n is an integer from 2 to 4.

8. The process of claim 5, wherein said composition is ultraviolet curable and further includes from about 0.5 to about 10 weight percent of a photoinitiator selected from the group of substituted acetophenones.

9. The process of claim 5, wherein said photoinitiator is (p-phenoxy) dichloro acetophenone.

10. The process of claim 5, wherein said photoinitiator is dimethoxyphenyl acetophenone.

11. The process of claim 6, wherein said triacrylate is pentaerythritol triacrylate.

12. The process of claim 7, wherein said triacrylate is trimethylolpropane triacrylate.

13. The process of claim 7, wherein said N-vinyl imido group containing monomer is N-vinyl pyrrolidone.

14. The process of claim 8, wherein said radiation is ultraviolet light and said photoinitiator is selected from the group consisting of p-phenoxydichloro acetophenone and dimethoxyphenyl acetophenone and said radiation curing is carried out in the presence of air.

15. A pair of eyeglasses, having a frame and lenses, said lenses being formed of a material selected from the group consisting of cellulose acetate, cellulose acetate butyrate, cellulose acetate propionate, polycarbonate, polystyrene, methyl methacrylate, and styrene-methyl methacrylate copolymers and a coating on said material, said coating being the radiation cured product of an oligomer-free mixture of radiation polymerizable monomers consisting essentially of:
   (a) a triacrylate or tetracrylate monomer; and
   (b) an N-vinyl imido group containing monomer; wherein the weight ratio of acrylate monomer to vinyl monomer is in the range from about 1 to about 10 to 1, monomer (b) being present in a sufficient quantity to produce a composition having a viscosity substantially less than that of monomer (a).

16. The pair of glasses of claim 15, wherein said coating further includes an ultraviolet light absorber.

17. A laminate structure comprising a substrate and a coating on said substrate, said coating being the reaction product of the radiation curing of a substantially oligomer-free radiation curable coating composition comprising a mixture of radiation polymerizable monomers consisting essentially of:
   (a) a triacrylate or tetracrylate monomer; and
   (b) an N-vinyl imido group containing monomer; wherein the weight ratio of acrylate monomer to vinyl monomer is in the range from about 1 to about 10 to 1, monomer (b) being present in a sufficient quantity to produce a composition having a viscosity substantially less than that of monomer (a).

18. The laminate of claim 17, wherein said triacrylate or tetracrylate monomer is a triacrylate represented by the formula:

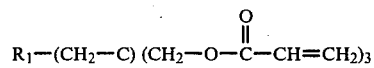

wherein $R^1$ is selected from the group consisting of $CH_3$ and $OH$.

19. The laminate of claim 17, wherein said N-vinyl imido group containing monomer is a lactam represented by the formula:

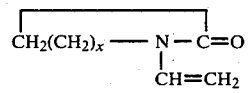

wherein n is an integer from 2 to 4.

20. The laminate of claim 17, wherein said composition is ultraviolet curable and further includes from about 0.5 to about 10 weight percent of a photoinitiator selected from the group of substituted acetophenones.

21. The laminate of claim 20, wherein said photoinitiator is (p-phenoxy) dichloro acetophenone.

22. The laminate of claim 20, wherein said photoinitiator is dimethoxyphenyl acetophenone.

23. The laminate of claim 18, wherein said triacrylate is pentaerythritol triacrylate.

24. The laminate of claim 18, wherein said triacrylate is trimethylolpropane triacrylate.

25. The laminate of claim 19, wherein said N-vinyl imido group containing monomer is N-vinyl pyrrolidone.

26. The laminate of claim 17, wherein said coating is optically clear.

* * * * *